US012739046B2

(12) United States Patent
Nandy et al.

(10) Patent No.: US 12,739,046 B2
(45) Date of Patent: Sep. 15, 2026

(54) COMMUNICATIONS OF TIMING MESSAGES OVER NETWORK PATHS

(71) Applicant: HEWLETT PACKARD ENTERPRISE DEVELOPMENT LP, Spring, TX (US)

(72) Inventors: Tathagata Nandy, Bangalore (IN); Chethan Chavadibagilu Radhakrishnabhat, Bangalore (IN); Venkatachalam Swaminathan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 380 days.

(21) Appl. No.: 18/533,718

(22) Filed: Dec. 8, 2023

(65) Prior Publication Data

US 2025/0141576 A1 May 1, 2025

(30) Foreign Application Priority Data

Oct. 25, 2023 (IN) ............................ 202341072673

(51) Int. Cl.
*H04J 3/06* (2006.01)

(52) U.S. Cl.
CPC .......... *H04J 3/0673* (2013.01); *H04J 3/0661* (2013.01)

(58) Field of Classification Search
CPC .......... H04J 3/0673; H04J 3/0661; H04J 3/12; H04J 3/0667; H04L 45/24
See application file for complete search history.

(56) References Cited

U.S. PATENT DOCUMENTS

2015/0139251 A1* 5/2015 Tzeng ....................... H04L 1/00 370/503
2017/0237512 A1* 8/2017 Galea .................... H04J 3/0644 370/350

(Continued)

FOREIGN PATENT DOCUMENTS

IN 202341064473 3/2025

OTHER PUBLICATIONS

B. Fenner et al., "Protocol Independent Multicast—Sparse Mode (PIM-SM): Protocol Specification (Revised)", Aug. 2006, 150 pages.

(Continued)

*Primary Examiner* — Ayaz R Sheikh
*Assistant Examiner* — Mang Boi Thawng
(74) *Attorney, Agent, or Firm* — Hewlett Packard Enterprise Patent Department

(57) ABSTRACT

In some examples, a first network device including a first time clock sends, over a first network path, a first timing message of a time synchronization process to synchronize the first time clock and a second time clock that is connected to a second network device. The first network device receives an indication associated with a second timing message of the time synchronization process, where the second timing message is to be sent from the second time clock. Based on receiving the indication, the first network device sends a first join message to a first intermediate network device that is part of the first network path, and a second join message to a second intermediate network device that is part of a second network path different from the first network path. The first network device receives, over the first network path, the second timing message sent by the second time clock, the second timing message communicated over the first network path based on the forward- (Continued)

ing information built in the first intermediate network device and the second network device.

20 Claims, 4 Drawing Sheets

(56) References Cited

U.S. PATENT DOCUMENTS

| | | | | |
|---|---|---|---|---|
| 2017/0366287 | A1* | 12/2017 | Zeng | H04J 3/0667 |
| 2018/0048409 | A1* | 2/2018 | Mizrahi | H04J 3/0664 |
| 2023/0092840 | A1* | 3/2023 | Budnik | H04L 67/104 370/503 |
| 2024/0291580 | A1* | 8/2024 | Ambeskar | H04J 3/0641 |

OTHER PUBLICATIONS

IEEE 1588-2008, "IEEE Standard for a Precision Clock Synchronization Protocol for Networked Measurement and Control Systems", Dec. 2005, 535 pages.
Juniper Networks, Inc., "Junos OS, Flow-Based and Packet-Based Processing User Guide for Security Devices", Jun. 15, 2023, 933 pages.
Juniper, "Junos OS, Multicast Protocols User Guide", Jun. 13, 2023, 2592 pages.
Wikipedia, "Equal-cost multi-path routing", Oct. 4, 2023, 2 pages.

* cited by examiner

400

First Intermediate Network Device

402

Hardware Processor

404

Storage Medium

First Timing Message Reception Instructions 406

First Timing Message Forwarding Instructions 408

First Join Message Reception Instructions 410

First Join Message Forwarding Instructions 412

Second Timing Message Reception Instructions 414

Second Timing Message Forwarding Instructions 416

COMMUNICATIONS OF TIMING MESSAGES OVER NETWORK PATHS

BACKGROUND

An electronic device in a distributed system of electronic devices includes a time clock that produces time, which can be wall-clock time or any other representation of time. Times produced by the time clocks in multiple electronic devices allows transactions occurring across the multiple electronic devices to be time-aligned with one another.

BRIEF DESCRIPTION OF THE DRAWINGS

Some implementations of the present disclosure are described with respect to the following figures.

Figure 1:
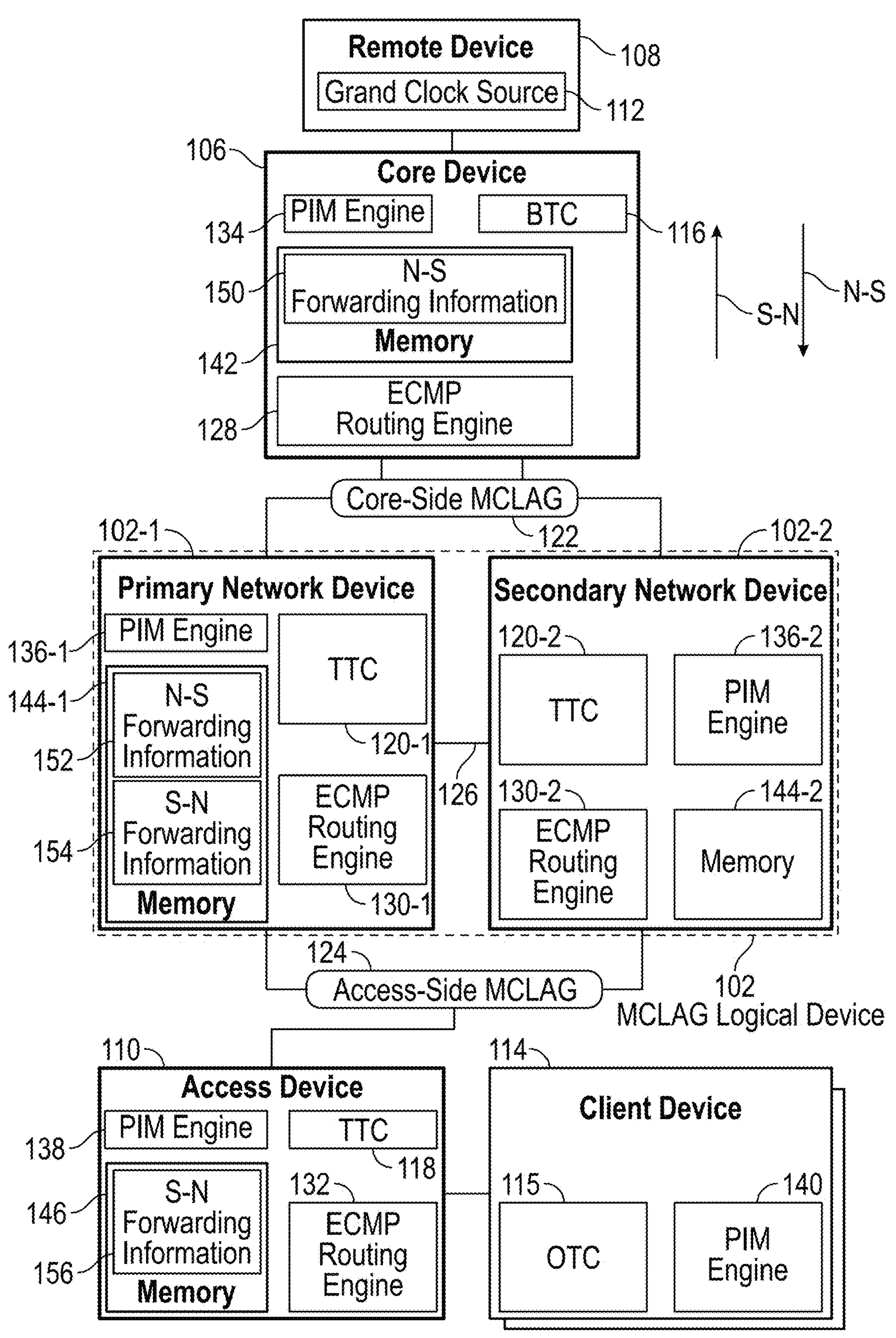
FIG. 1 is a block diagram of an arrangement that includes a multi-chassis link aggregation group (MCLAG) logical device connected to various other electronic devices, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

To maintain synchronization among time clocks (or more simply, "clocks") in electronic devices of a distributed system, a time synchronization process can be employed. In some examples, the time synchronization process can be according to a time synchronization protocol such as the Precision Time Protocol (PTP) described by an Institute of Electrical and Electronics Engineers (IEEE) 1588 Specification.

PTP employs timing messages exchanged between electronic devices (or more specifically, between clocks of the electronic devices) to perform time synchronization. The distributed system can include a network to interconnect the electronic devices. The network includes physical network links (or more simply "network links") between electronic devices. In some cases, for data traffic load distribution and/or network path redundancy, it may be possible to employ multiple network paths (that include respective network links) for data communications between a source electronic device and one or more destination electronic devices. For example, equal-cost multipath routing (ECMP) may be employed in which data traffic may occur over multiple network links of equal cost, based on metrics associated with network links and/or preferences associated with the network links.

Implementing a time synchronization protocol such as PTP in a network where timing messages may traverse different network paths between electronic devices, may lead to network path asymmetry in a time synchronization process between the clocks of the electronic devices. The network path asymmetry is caused by timing messages of the time synchronization process between the clocks traversing different network paths in different directions. For example, a first clock in a first electronic device may send a first timing message over a first network path to a second clock in a second electronic device. However, based on use of ECMP, the second clock may send a second timing message (that responds to the first timing message) over a second network path to the first clock.

Network path asymmetry can lead to inaccurate calculations of delays over network paths, which can lead to inaccurate time offset calculations. A time offset refers to a difference in time between clocks (including a clock source and a clock sink) based on various delays between the clock source and the clock sink. A clock sink refers to a time clock that is to synchronize to the clock source.

In further cases, multiple intermediate network devices may be present between a clock source and a clock sink. To correctly forward timing messages through the intermediate network devices, forwarding information has to be built in the intermediate network devices so that a timing message can be forwarded based on the forwarding information to a recipient (e.g., a clock sink) of the timing message. If the forwarding information is not present in a given intermediate network device, then the given intermediate network device would not be able to forward a timing message, which results in the given intermediate network device simply discarding the timing message. The timing message is thus lost and would not reach the intended recipient, which means that the time synchronization process would fail.

In accordance with some implementations of the present disclosure, network path asymmetry for timing messages and loss of timing messages of a time synchronization process are avoided by building forwarding information at network devices through which the time messages are to be routed so that (1) each of the network devices would be able to forward the timing messages to target recipients, and (2) a same network path is used to forward the timing messages in both directions between a clock source and a clock sink to achieve path symmetry for the timing messages. In some examples of the present disclosure, a clock source network device (which includes the clock source) sends, from the clock source network device over a first network path, a first timing message (e.g., a synchronization message) of a time synchronization process to synchronize the clock source and the clock sink that is connected to a clock sink network device. The clock source network device receives an indication (e.g., a register message) associated with a second timing message (e.g., a delay-request message) of the time synchronization process, where the second timing message is to be sent from the clock sink. Based on receiving the indication, the clock source network device sends a first join message over the first network path, and a second join message over a second network path different from the first network path. The first network path passes through a first intermediate network device including a first transparent time clock, and the second network path passes through a second intermediate network device including a second transparent time clock. The first join message causes building of forwarding information in both the first intermediate network device and the clock sink network device. The first network device receives, over the first network path, the second timing message communicated over the first network path based on the forwarding information built in the first intermediate network device and the clock sink network device.

FIG. 1 is a block diagram of an example arrangement including various electronic devices coupled by multiple network paths. As used here, "network devices" can refer to any or some combination of the following: switches, routers, or other forwarding devices that are able to forward packets along network links. A "packet" can refer to a data packet that carries data or a control packet that carries control information. A payload of the packet carries data or control information, while a header of the packet includes fields used for forwarding of the packet in a network and for identifying information of one or more communication protocols associated with the packet.

In some examples, the network devices support ECMP routing. ECMP routing at a network device allows packets of a session or flow to be forwarded across multiple network links of equal cost, for purposes of data traffic load balancing and to achieve increased data communication throughput based on use of the increased bandwidth provided by multiple network links. Network links of equal cost may be determined according to metrics relating to performance of the network links and/or according to other factors, such as preferences, priorities, and so forth.

When forwarding a packet using ECMP routing, a given network device determines a next-hop path to use. The "next-hop path" includes a network link from the given network device to a next network device. There may be multiple candidate next-hop paths (including respective network links) from the given network device to one or more next network devices. The multiple candidate next-hop paths may have equal cost, in which case they form an ECMP set. The network device can choose which next-hop path of the ECMP set to use for forwarding the packet, such as based on application of a hash function on information of the next-hop paths of the ECMP set to produce a hash value that maps to a selected next-hop path.

In some examples, the arrangement of FIG. 1 employs multi-chassis link aggregation. In other examples, multi-chassis link aggregation is not employed. Multi-chassis link aggregation provides a logical link aggregation group (LAG) between a network device and plural (e.g., two or greater than two) multi-chassis link aggregation group (MCLAG) peer network devices. The plural MCLAG peer network devices form an "MCLAG logical device" that appears as a single device to other network devices, where the MCLAG logical device presents a LAG with multiple network links.

FIG. 1 shows an MCLAG logical device 102 that has a primary network device 102-1 and a secondary network device 102-2 (which are peer network devices of the MCLAG logical device 102). Although referred to as "primary" and "secondary" network devices, note that the network devices 102-1 and 102-2 of the MCLAG logical device 102 are both active (e.g., operate in an active-active configuration) and support communications with other electronic devices.

The plural MCLAG peer network devices of the MCLAG logical device 102 are in separate chassis, where "chassis" can refer to any physical boundary or delineation. Network devices in separate chassis are physically separate devices that can run independently of one another, such that one of the network devices can continue to operate even if another one of the network devices is nonfunctional. MCLAG provides redundancy and load balancing between the plural MCLAG peer devices.

In other examples, MCLAG is not employed, and the network devices 102-1 and 102-2 are part of a different collection of network devices that support multiple network paths in a network.

The arrangement of FIG. 1 further includes a core device 106 between the MCLAG logical device 102 and a remote device 108. The remote device 108 may include an electronic device that is part of a cloud, an arrangement of one or more servers, a data center, or any other computing environment. The remote device 108 may include a grand clock source 112, which is a clock source with a higher clock quality (than other clocks in the arrangement of FIG. 1) and which may have direct access to a reference clock. The reference clock may include a high frequency oscillator, a Global Positioning System (GPS) clock, or any other time reference. According to PTP, the grand clock source is a grand master clock.

The core device 106 can be a network device between the remote device 108 and the MCLAG logical device 102. Although FIG. 1 shows one core device 106 between the remote device 108 and the MCLAG logical device 102, in other examples, there may be multiple core devices between the remote device 108 and the MCLAG logical device 102.

The core device 106 includes a boundary time clock (BTC) 116. The BTC 116 is synchronized to the grand clock source 112 (or another clock source in other examples). A "boundary time clock" (or more simply, a "boundary clock") refers to a time clock in an electronic device that synchronizes to a clock source that is upstream of the boundary time clock and acts as a clock source to a clock sink downstream of the boundary time clock. A first time clock is "upstream" of a second time clock if the second time clock uses the first time clock as a clock source (i.e., the second time clock is a clock sink of the first time clock). In this example, the second time clock is "downstream" of the first time clock. According to PTP, a clock source is a master clock, and a clock sink is a slave clock.

FIG. 1 further shows client devices 114. Each client device 114 has an ordinary time clock (OTC) 115 (or more simply an "ordinary clock"). An ordinary time clock is a time clock that is not connected to any downstream time clock (i.e., the ordinary time clock does not act as a clock source for another time clock). A "client device" can refer to an electronic device that accesses a remote service in a system, such as services in a cloud, on a server, in a datacenter, or any other computing platform. In the example of FIG. 1, the ordinary time clock 115 is synchronized to the BTC 116 in the core device 106.

The arrangement of FIG. 1 further includes an access device 110 (or multiple access devices) to which the client devices 114 connect to access a remote service. The access device 110 is a network device connected between the client devices 114 and the MCLAG logical device 102. In some examples, the access device 110 may include an access point (AP) of a wireless local area network (WLAN), a base station of a cellular network, or any other type of network device. In further examples, multiple access devices may be provided between the client devices 114 and the MCLAG logical device 102.

The access device 110 includes a transparent time clock (TTC) 118 (or more simply a "transparent clock"). The primary network device 102-1 includes a TTC 120-1, and the secondary network device 102-2 includes a TTC 120-2. A transparent time clock is an intermediate time clock that can calculate time delays but the transparent time clock does not synchronize to other time clocks. In contrast, a boundary time clock and an ordinary clock are synchronized with other time clocks.

The MCLAG logical device 102 presents a core-side MCLAG 122 to the core device 106, and the MCLAG logical device 102 presents an access-side MCLAG 124 to the access device 110. The core-side MCLAG 122 includes a collection of network links that are connected to interfaces of the primary network device 102-1 and the secondary network device 102-2, and to interfaces of the core device 106. The access-side MCLAG 124 includes a collection of network links that are connected to interfaces of the primary network device 102-1 and the secondary network device 102-2, and to interfaces of the access device 110. The interfaces of a network device are also referred to as "ports," and an interface may be connected to a respective network link of a LAG. Interfaces connected to network links of a LAG are referred to as "LAG interfaces" (or "LAG ports").

The MCLAG logical device 102 also includes an inter-device link 126 between the primary network device 102-1 and the secondary network device 102-2. If the primary and secondary network devices 102-1 and 102-2 are switches, the inter-device link 126 may be referred to as an inter-switch link. The inter-device link 126 can refer to any communication path between the primary and secondary network devices 102-1 and 102-2. The inter-device link 126 is used to exchange information of the primary and secondary network devices 102-1 and 102-2.

In some examples, the core device 106, the primary and secondary network devices 102-1 and 102-2, and the access device 110 are network devices that support ECMP routing. The core device 106 includes an ECMP routing engine 128, the primary network device 102-1 includes an ECMP routing engine 130-1, the secondary network device 102-2 includes an ECMP routing engine 130-2, and the access device 110 includes an ECMP routing engine 132.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

Each of the ECMP routing engines 128, 130-1, 130-2, and 132 can perform ECMP routing in which the ECMP routing engine identifies an ECMP set of equal-cost network links (next-hop paths) and selects a network link (next-hop path) from among the ECMP set for forwarding a given packet.

Electronic devices in the example of FIG. 1, including the core device 106, the primary and secondary network devices 102-1 and 102-2, the access device 110, and the client devices 114 support multicasting of packets through network paths. More specifically, in FIG. 1, the various electronic devices support multicasting of timing messages, such as PTP timing messages. Multicasting of a packet (e.g., a timing message) refers to sending the packet to members of a multicast group, which can be associated with a particular multicast group address (e.g., a multicast Internet Protocol (IP) address). In some examples, multicast routing is performed using Protocol Independent Multicast (PIM), which includes a collection of multicast routing protocols, including a PIM Sparse Mode (PIM-SM) protocol, a PIM Dense Mode (PIM-DM) protocol, and a Bi-Directional PIM (PIM-Bidir) protocol.

With the PIM-SM or PIM-DM protocol, for a given electronic device to receive multicast data, the given electronic device notifies upstream electronic devices about the given electronic device's interest in joining a particular multicast group. With respect to multicasting, a first electronic device is upstream of a second electronic device if the first electronic device sends multicast data to the second electronic device. The second electronic device can send a PIM Join message to join a multicast distribution tree. The first electronic device receiving the PIM Join message can add information to the multicast distribution tree indicating that the second electronic device is to receive multicast data sent by the first electronic device.

A multicast distribution tree connects receivers to sources. The multicast distribution tree is rooted at the source. A multicast distribution tree maps network paths of multicast traffic through a network. A multicast distribution tree may be identified by a combination of a multicast group address and a source address (which can be a "wildcard" value). The source address is a network address of a source of multicast data. If the source address has a wildcard value, that indicates that any electronic device of a multicast group identified by the multicast group address can send multicast data. Once an electronic device has joined a multicast distribution tree, multicast data sent according to the multicast distribution tree is forwarded to the electronic device.

In examples where PIM-SM or PIM-DM are used, different multicast distribution trees are provided in different directions in the network. For example, a first direction can be from the core device 106 to a client device 114 (this is referred to as an "N-S" direction and is represented by an N-S arrow in FIG. 1). A second direction, opposite of the first direction, is from a client device 114 to the core device 106 (this is referred to as an "S-N" direction and is represented by an S-N arrow in FIG. 1). If PIM-Bidir is employed, bidirectional shared multicast distribution trees are employed in the two different directions (N-S and S-N). Techniques or mechanisms according to some examples of the present disclosure can be applied with electronic devices that employ any of the PIM-SM, PIM-DM, and PIM-Bidir protocols.

Although reference is made to PIM in some examples, in other examples, other types of multicast routing protocols can be employed.

A rendezvous point (RP) for a multicast distribution tree is a network device (e.g., a router) that serves as a point of contact for multicast senders and receivers. The RP serves as the information exchange point for other network devices. In the example of FIG. 1, the core device 106 is an RP for a multicast distribution tree related to multicasting of timing messages of a clock synchronization process. In other examples, another network device may serve as an RP for the multicast distribution tree related to multicasting of timing messages of a clock synchronization process.

In examples where PIM is employed, the core device 106 includes a PIM engine 134, the primary network device 102-1 includes a PIM engine 136-1, the secondary network device 102-2 includes a PIM engine 136-2, the access device 110 includes a PIM engine 138, and each client device 114 includes a PIM engine 140. A PIM engine performs operations to support PIM multicasting, which includes building multicast distribution trees (more generally represented as "forwarding information" in FIG. 1). Building a multicast distribution tree (or more generally, building forwarding information) in a network device refers to creating the multicast distribution tree (or forwarding information) or updating the multicast distribution tree (or forwarding information). “Forwarding information” in a network device refers to information used by the network device to select a next-hop path for forwarding a packet. The forwarding information may be in the form of a tree (e.g., if PIM is employed) or can have any other form (e.g., a routing table, etc.).

FIG. 1 shows an example in which PIM-SM or PIM-DM is employed, which results in different multicast distribution trees (or forwarding information) to be built for different directions (e.g., the N-S and S-N directions). In other examples, if PIM-Bidir is employed, then a bidirectional multicast distribution tree is shared for both the N-S and S-N directions.

In examples according to FIG. 1, the core device 106 includes a memory 142, the primary network device 102-1 includes a memory 144-1, the secondary network device 102-2 includes a memory 144-2, and the access device 110 includes a memory 146. A memory can be implemented using one or more memory devices, such as any or some combination of the following: a dynamic random access memory (DRAM) device, a static random access memory (SRAM) device, a flash memory device, or another type of memory device.

The memories in the various devices can be employed to store forwarding information, such as a PIM multicast distribution tree. In examples according to FIG. 1, N-S forwarding information (e.g., an N-S PIM multicast distribution tree) is used by a network device to forward packets in the N-S direction, and S-N forwarding information (e.g., an S-N PIM multicast distribution tree) is used by a network device is used for forwarding packets in the S-N direction.

Figure 2:
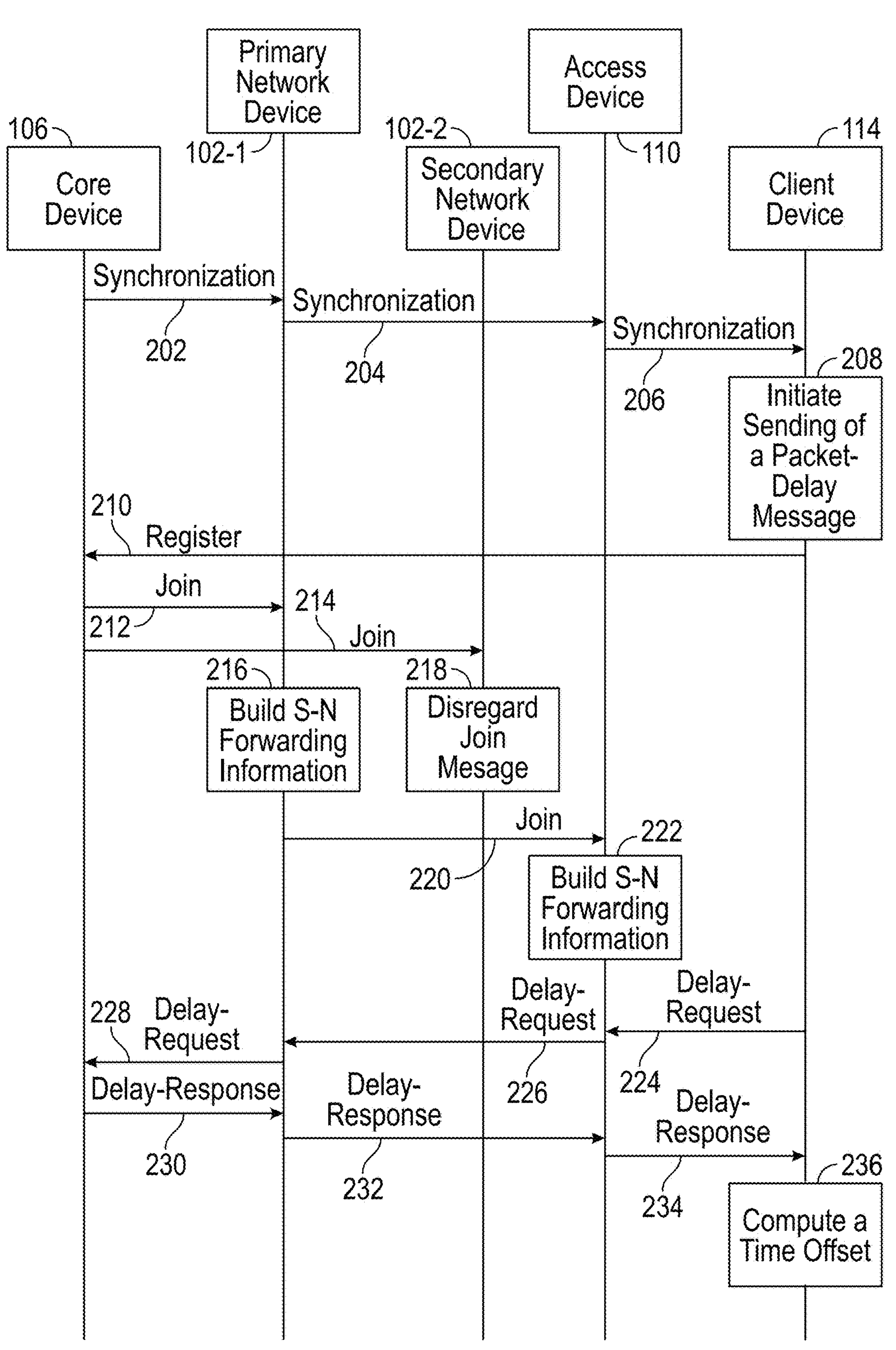
FIG. 2 is a flow diagram of a process of a core device, primary and secondary network devices, an access device, and a client device, according to some examples.

FIG. 2 is a flow diagram of an example process performed by the core device 106, the primary network device 102-1, the secondary network device 102-2, the access device 110, and a client device 114. The process includes tasks associated with a time synchronization process to be performed between the BTC 116 of the core device 106 and the OTC 115 at the client device 114, which is to synchronize the OTC 115 to the BTC 116. Although FIG. 2 depicts a sequence of tasks, it is noted that in other examples, the tasks may be performed in a different order, some of the tasks may be omitted, and other tasks may be added.

Also, although some examples discussed herein refer to synchronizing an OTC to a BTC, it is noted that in other examples, similar techniques and mechanisms can be applied to synchronize any type of clock sink to a clock source (e.g., one BTC to another BTC, a BTC to a grand clock source, or any other combination of time clocks).

In examples according to FIG. 2, timing messages, such as PTP timing messages, are sent using multicast. Thus, the timing messages referred to in FIG. 2, which include a synchronization message, a delay-request message, and a delay-response message, are multicast by a sender for receipt by multiple recipients of a multicast group. In the example of FIG. 2, the multicast group includes devices involved in performing the time synchronization process. Such a multicast group is referred to as a “time synchronization multicast group.”

In the ensuing discussion, reference to “sending” a timing message may refer to multicasting the timing message. Other types of messages, such as PIM messages, may be sent via unicast.

The BTC 116 in the core device 106 sends (at 202) a synchronization message (e.g., a PTP Sync) in the N-S-direction. To send the synchronization message, the ECMP routing engine 128 in the core device 106 selects a network link (a next-hop path) from among multiple network links (that make up an ECMP set) of the core-side MCLAG 122, which connects the core device 106 to the primary network device 102-1 and the secondary network device 102-2 of the MCLAG logical device 102.

In examples according to FIG. 1, it is assumed that the network link (referred to as “Network Link A”) selected by the ECMP routing engine 128 for sending the synchronization message is a network link from the core device 106 to the primary network device 102-1. In other examples, it is possible that the network link selected is from the core device 106 to the secondary network device 102-2. The ensuing discussion is in the context of the example in which the selected network link (Network Link A) of the synchronization message is from the core device 106 to the primary network device 102-1.

The synchronization message sent at 202 is received at the primary network device 102-1. Note that in this example, the synchronization message from the core device 106 is not received at the secondary network device 102-2. In response to the received synchronization message, the ECMP routing engine 130-1 in the primary network device 102-1 selects a network link from network links in an ECMP set that are part of the access-side MCLAG 124. The ECMP routing engine 130-1 forwards (at 204) the synchronization message along the selected network link (referred to as “Network Link B”) of the access-side MCLAG 124.

The synchronization message forwarded by the primary network device 102-1 is received at the access device 110. The access device 110 forwards (at 206) the synchronization message over a network link to the client device 114, and to any other client device is also part of the time synchronization multicast group.

As a result of the multicast of the synchronization message in the N-S-direction from the core device 106 to one or more client devices, N-S forwarding information 150 is built by the PIM engine 134 at the core device 106 and N-S forwarding information 152 is built by the PIM engine 136-1 at the primary network device 102-1. The N-S forwarding information 150 built at the core device 106 is saved to the memory 142 in the core device 106, and the N-S forwarding information 152 built at the primary network device 102-1 is saved to the memory 144-1 in the primary network device 102-1.

The N-S forwarding information 150 and 152 are used at the core device 106 and the primary network device 102-1, respectively, to select network links to use for sending multicast packets of the time synchronization multicast group. The N-S forwarding information 150 identifies Network Link A as the network link between the core device 106 and the primary network device 102-1 used to send a multicast packet of the time synchronization multicast group, and the N-S forwarding information 152 identifies Network Link B as the network link between the primary network device 102-1 and the access device 110 used to send a multicast packet of the time synchronization multicast group.

Collectively, Network Link A of the core-side MCLAG 122, Network Link B of the access-side MCLAG 124, and the network link between the access device 110 and the client device 114 are part of a network path between the core device 106 and the client device 114 for communication of multicast packets of the time synchronization multicast group.

In response to the synchronization message received at the client device 114, the OTC 115 in the client device 114 initiates (at 208) the sending of a delay-request message (e.g., PTP DelayReq). At this point, the client device 114 does not actually send the delay-request message. Rather, in response to an indication from the OTC 115 that the delay-request message is to be sent, the PIM engine 140 in the client device 114 sends (at 210) a register message (e.g., PIM Register) to the PIM rendezvous point (RP), which in the example of FIG. 1 is the core device 106. Note that the register message can traverse through the access device 110 and one of the primary and secondary network devices 102-1 and 102-2 to reach the core device 106. The register message may follow a network path in the S-N direction different from the network path of the synchronization message in the N-S direction from the core device 106 to the client device 114.

The register message advertises the time synchronization multicast group that the client device 114 wishes to join for the purpose of sending multicast packets, including the delay-request message. For example, the register message can include a multicast address of the time synchronization multicast group. Note that the flow of multicast packets, including the delay-request message, from the source (e.g., the client device 114) in the S-N direction is different from the flow of the synchronization message sent in the N-S direction.

The PIM engine 134 at the core device 106 learns (at 212) the group information advertised by the register message. The group information includes the multicast address of the time synchronization multicast group, and source information of the client device 114. The source information of the client device 114 can include a network address (e.g., an IP address) of the client device 114, and possibly other information of the client device 114.

In response to the register message, the PIM engine 134 in the core device 106 sends join messages (e.g., PIM Join) towards the client device 114, which is the source of the delay-request message to be sent. In accordance with some implementations of the present disclosure, the PIM engine 134 sends join messages to both the primary network device 102-1 and the secondary network device 102-2 of the MCLAG logical device 102. In other words, the PIM engine 134 sends join messages to multiple intermediate network devices that may be between the core device 106 and the access device 110.

Specifically, as shown in FIG. 2, the PIM engine 134 sends (at 212) a join message to the primary network device 102-1, and sends (at 214) a join message to the secondary network device 102-2. The join messages sent at 212 and 214 have the same content to identify the multicast distribution tree corresponding to the time synchronization multicast group that the core device 106 wishes to join for purposes of receiving the delay-request message that is multicast by the client device 114.

Note that when sending a join message, the ECMP routing engine 128 of the core device 106 may perform ECMP routing to select a network link from an ECMP set to forward the join message. It may be possible that if just a single join message is sent by the core device 106 to the MCLAG logical device 102, the join message may be forwarded over a selected network link to the secondary network device 102-2 instead of to the primary network device 102-1. In the example discussed in connection with FIGS. 1 and 2, it is assumed that the synchronization message sent (at 202) by the core device 106 was forwarded to the primary network device 102-1.

If the join message is received by the secondary network device 102-2 and not by the primary network device 102-1, then the join message would not be forwarded further downstream to the access device 110 (this join message would be disregarded by the secondary network device 102-2 for the reason discussed further below). However, by sending join messages to both the primary network device 102-1 and the secondary network device 102-2, it can be ensured that one of the join messages is forwarded to the access device 110.

Upon receipt of the join message, each of the primary network device 102-1 and the secondary network device 102-2 makes a determination of whether or not to process the join message. The PIM engine 136-1 in the primary network device 102-1 processes the join message based on detecting that an N-S multicast path exists from the core device 106 to the client device 114. This determination is based on presence of the N-S forwarding information 152 stored in the memory 144-1 of the primary network device 102-1.

On the other hand, since the synchronization message from the core device 106 did not pass through the secondary network device 102-2, no N-S forwarding information exists in the secondary network device 102-2 for a multicast path from the core device 106 to the client device 114. As a result, the PIM engine 136-2 in the secondary network device 102-2 disregards (at 218) the join message from the core device 106. For example, the join message received by the secondary network device 102-2 is discarded by the secondary network device 102-2.

Processing the join message at the primary network device 102-1 includes the PIM engine 136-1 in the primary network device 102-1 building (at 216) S-N forwarding information 154 for multicast traffic in the S-N direction from the client device 114 to the core device 106. The S-N forwarding information 154 that is built at 216 identifies the same network path for S-N multicast traffic sent from the client device 114 as was used to send the synchronization message in the N-S direction. In other words, the S-N forwarding information 154 includes information specifying that S-N multicast traffic from the client device 114 is to follow Network Link A of the core-side MCLAG 122. The PIM engine 136-1 saves the S-N forwarding information 154 in the memory 144-1 of the primary network device 102-1.

Further, the processing of the join message includes the PIM engine 136-1 forwarding (at 220) the join message to the access device 110. In response to the join message received at the access device 110, the PIM engine 138 in the access device 110 builds (at 222) S-N forwarding information 156 for forwarding multicast data from the client device 114 to the core device 106. The S-N forwarding information 156 that is built at 222 identifies the same network path for S-N multicast traffic sent from the client device 114 as was used to send the synchronization message in the N-S direction. In other words, the S-N forwarding information 156 includes information specifying that S-N multicast traffic from the client device 114 is to follow Network Link B of the access-side MCLAG 124. The PIM engine 138 saves the S-N forwarding information 156 in the memory 146 of the access device 110.

The client device 114 sends (224) the delay-request message to the access device 110. If the delay-request message is received at the access device 110 prior to the S-N forwarding information 156 being built (at 222), the access device 110 may simply discard the join message and the client device 114 can retry the sending of the delay-request message later.

Assuming that the S-N forwarding information 156 has been built at the access device 110, the access device 110 forwards (at 226) the delay-request message from the client device 114 to the primary network device 102-1 along the same network path as the synchronization message, i.e., the ECMP routing engine 132 of the access device 110 selects, based on the S-N forwarding information 156, Network Link B of the access-side MCLAG 124.

In response to receipt of the delay-request message at the primary network device 102-1, the ECMP routing engine 130-1 in the primary network device 102-1 selects, based on the S-N forwarding information 154, Network Link A of the core-side MCLAG 122 to forward (at 228) the delay-request message to the core device 106. This ensures that the S-N delay-request message follows the same network path (as the N-S synchronization message) to the core device 106.

In response to the delay-request message, the BTC 116 in the core device 106 sends a delay-response message (e.g., PTP DelayResp). The ECMP routing engine 128 in the core device selects, based on the N-S forwarding information 150 in the memory 142, Network Link A of the core-side MCLAG 122 to forward (at 230) the delay-response message to the primary network device 102-1. This ensures that the delay-response message follows the same network path as the synchronization message and the delay-request message.

In response to receipt of the delay-response message, the ECMP routing engine 130-1 selects, based on the N-S forwarding information 152 in the memory 144-1 of the primary network device 102-1, Network Link B of the access-side MCLAG 124 to forward (at 232) the delay-response message along the same network path as the synchronization message and the delay-request message. The access device 110 forwards (at 234) the delay-response message to the client device 114.

Using timestamps associated with the synchronization message, the delay-request message, and the delay-response message, the OTC 115 in the client device 114 is able to compute (at 236) a time offset between the BTC 116 and the OTC 115. The time offset is used to synchronize the OTC 115 to the BTC 116.

In examples according to PTP, the time offset can be computed as follows. The synchronization message is sent (at 202) by the clock source (BTC 116) to the clock sink (OTC 115) to initiate the time synchronization process. The clock source can record an egress time (T1), which is the time at which the synchronization message was sent. If the clock source is a one-step clock, then T1 can be carried in the synchronization message. If the clock source is a two-step clock, then T1 is carried in a follow-up message (PTP Follow-Up) sent after the synchronization message (not shown in FIG. 2). Upon receiving the synchronization message (or if applicable the follow-up message), the clock sink records an ingress time (T2) at which the clock sink 204 received the synchronization message 206. The clock sink also records the egress time (T1) from the clock source, where T1 may be included in the synchronization message or the follow-up message. The clock sink sends (at 224) the delay-request message to the clock source. The clock sink can record an egress time (T3) at which the delay-request message was sent from the clock sink. The clock source receives the delay-request message and records an ingress time (T4) at which the delay-request message was received at the clock source. The clock source then sends (at 230) a delay-response message 212 to the clock sink 204. The delay-response message 212 contains the ingress time (T4) of the delay-request message 210. Using T1, T2, T3, and T4, the clock sink (OTC 115) is able to determine the time offset of the clock sink relative to the clock source, such as using computations according to the PTP. The time offset refers to a difference in time between the clock source and the clock sink based on various delays between the clock source and the clock sink.

By using techniques or mechanisms according to some examples of the present disclosure, timing messages of a time synchronization process can follow the same network path in both the N-S and S-N directions to achieve network path symmetry. This increases the likelihood that a time offset computed based on the timing messages of the time synchronization process can be more accurate as compared to scenarios in which timing messages follow asymmetric network paths. Additionally, techniques or mechanisms according to some examples of the present disclosure increase the likelihood that forwarding information for the time synchronization multicast group is properly built in each network device between a clock source and a clock sink that is to synchronize to the clock source, so that timing messages can follow a symmetric network path. Ensuring that forwarding information for the time synchronization multicast group is properly built in network devices avoids the situation where a network device discards a timing message because of the lack of forwarding information at the network device.

As noted above, some examples according to FIGS. 1 and 2 assume use of PIM-SM or PIM-DM. In other examples where PIM-Bidir is used, instead of using separate N-S and S-N forwarding information in each network device, the N-S and S-N forwarding information can be integrated into a bidirectional forwarding information used for multicast traffic in both the N-S and S-N directions.

Figures 3, 4:
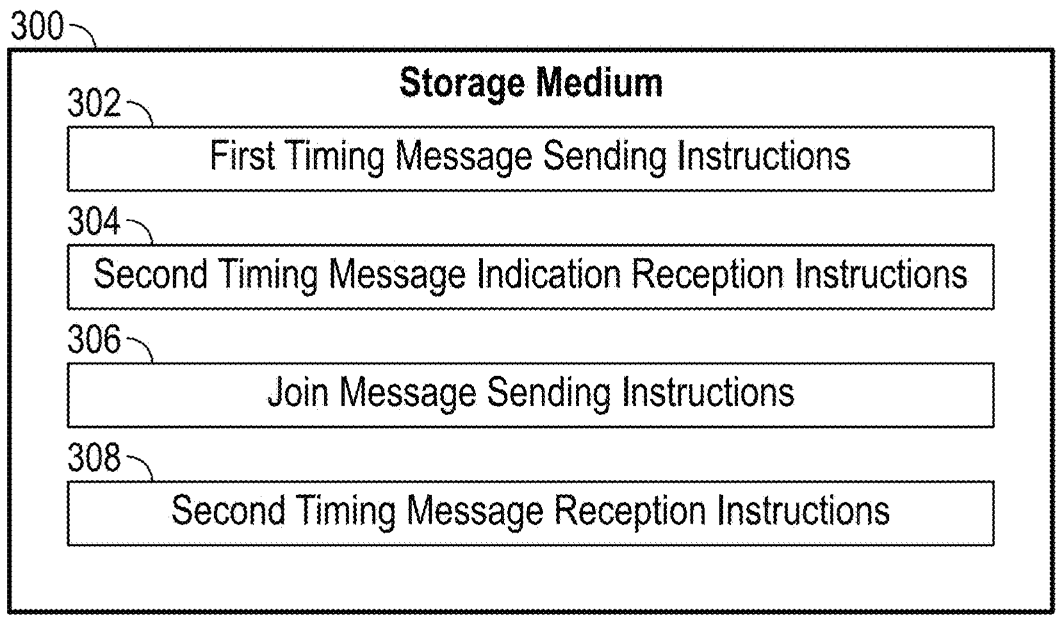
FIG. 3 is a block diagram of a storage medium storing machine-readable instructions according to some examples.
FIG. 4 is a block diagram of an intermediate network device according to some examples.

FIG. 3 is a block diagram of a non-transitory machine-readable or computer-readable storage medium 300 storing machine-readable instructions that upon execution cause a first network device including a first time clock to perform various tasks. An example of the first network device is the core device 106 of FIG. 1, and an example of the first time clock is the BTC 116 in the core device 106.

The machine-readable instructions include first timing message sending instructions 302 to send, from the first network device over a first network path, a first timing message of a time synchronization process to synchronize the first time clock and a second time clock that is connected to a second network device. An example of the second network device is the access device 110 of FIG. 1, and an example of the second time clock is the OTC 115 of FIG. 1. An example of the first timing message is a synchronization message, such as the synchronization message sent at 202 from the core device 106 in FIG. 2. In some examples, the first network path includes a first network link selected by a routing engine (e.g., the ECMP routing engine 128) at the first network device, where the first network link is one of multiple network links (e.g., part of an ECMP set) between the first network device and a collection of intermediate network devices (e.g., 102-1 and 102-2 in FIG. 1).

The machine-readable instructions include second timing message indication reception instructions 304 to receive, at the first network device, an indication associated with a second timing message of the time synchronization process, the second timing message to be sent from the second time clock. In some examples, the second timing message is a delay-request message. In some examples, the indication is a register message (e.g., a PIM Register), such as the register message received at 210 by the core device 106 from the client device 114 in FIG. 2. The register message advertises the time synchronization multicast group that the second time clock wishes to join for the purpose of sending multicast packets, including the second timing message.

The machine-readable instructions include join message sending instructions 306 to, based on receiving the indication, send, from the first network device, a first join message to a first intermediate network device (e.g., 102-1 in FIG. 1) that is part of the first network path, and a second join message to a second intermediate network device that is part of a second network path different from the first network path. For example, the first join message is the join message sent at 212 by the core device 106 in FIG. 2, and the second join message is the join message sent at 214 by the core device 106 in FIG. 2. In some examples, the first intermediate network device includes a first transparent clock, and the second intermediate network device includes a second transparent clock. The first join message is to cause building of forwarding information in the first intermediate network device and the second network device (e.g., the S-N forwarding information 154 in the primary network device 102-1 and the S-N forwarding information 156 in the access device 110).

The machine-readable instructions include second timing message reception instructions 308 to receive, at the first network device over the first network path, the second timing message sent by the second time clock, the second timing message communicated over the first network path based on the forwarding information built in the first intermediate network device and the second network device. For example, the second timing message is the delay-request message received at 228 by the core device 106 in FIG. 2. The second timing message is communicated over the first network path based on a next-hop path selection according to the forwarding information (e.g., the S-N forwarding information 154 and 156) built in the first intermediate network device and the second network device. The first timing message and the second timing message both traverse the first network path, which achieves network path symmetry associated with the time synchronization process.

In some examples, as a response to the second timing message, the machine-readable instructions send a third timing message generated by the first time clock, where the third timing message is sent to the second time clock also over the first network path. An example of the third timing message is a delay-response message.

In some examples, the forwarding information built in the first intermediate network device and the second network device includes first forwarding information (e.g., S-N forwarding information 154 and 156 in FIG. 1). The first timing message sent from the first network device causes second forwarding information (e.g., N-S forwarding information 150 and 152) to be built at the first network device and the first intermediate network device. The third timing message is sent to the second time clock over the first network path based on a next-hop path selection according to the second forwarding information.

In some examples, the first forwarding information is for multicast traffic in a first direction (e.g., S-N direction in FIG. 1) from the second time clock, and the second forwarding information is for multicast traffic in a second direction (e.g., N-S direction in FIG. 1) from the first time clock.

In some examples, the first forwarding information is separate from the second forwarding information, such as separate S-N and N-S multicast distribution trees used when PIM-SM or PIM-DM is applied.

In some examples, the first forwarding information is integrated with the second forwarding information in bidirectional forwarding information (a bidirectional multicast distribution tree) for use in multicasting of traffic in each of the first direction and the second direction, such as when PIM-Bidir is applied.

In some examples, the first timing message of the time synchronization process passes through the first intermediate network device, and the first timing message causes the first intermediate network device to build forwarding information (e.g., the N-S forwarding information 152 of FIG. 1) in a direction (e.g., the N-S direction) from the first network device to the second network device. The forwarding information in the direction from the first network device to the second network device built at the first intermediate network device causes the first intermediate network device to process the first join message, which includes building the S-N forwarding information (e.g., 154 in FIG. 1) at the first intermediate network device, and forwarding the first join message from the first intermediate network device to the second network device.

FIG. 4 is a block diagram of a first intermediate network device 400 according to some examples. The first intermediate network device can be the primary network device 102-1 or the secondary network device 102-2 of FIG. 1. In some examples, the first intermediate network device is part of a collection of intermediate network devices, such as peer network devices of an MCLAG logical device (e.g., 102 in FIG. 1) or any other type of collection of intermediate network devices.

The first intermediate network device 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit The first intermediate network device 400 includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions in the storage medium 404 include first timing message reception instructions 406 to receive, over a first network link (e.g., a network link of the core-side MCLAG 122 in FIG. 1), a first timing message (e.g., a synchronization message) multicast by a clock source (e.g., the BTC 116 in FIG. 1) to initiate a time synchronization process to synchronize a clock sink (e.g., the OTC 115 in FIG. 1) to the clock source. The clock sink is connected to a clock sink network device, such as the access device 110 of FIG. 1. The first timing message can be the synchronization message received at 202 by the primary network device 102-1 in FIG. 2.

The machine-readable instructions in the storage medium 404 include first timing message forwarding instructions 408 to forward, from the first intermediate network device, the first timing message over a second network link (e.g., a network link of the access-side MCLAG 124 in FIG. 1) to the clock sink network device. A first network path includes the first network link and the second network link. For example, in FIG. 2, the primary network device 102-1 forwards at 204 the synchronization message to the access device 110.

The machine-readable instructions in the storage medium 404 include first join message reception instructions 410 to receive, at the first intermediate network device that is part of the first network path, a first join message from a clock source network device (e.g., the core device 106 in FIG. 1)

that includes the clock source. For example, the primary network device 102-1 receives at 212 the join message from the core device 106 in FIG. 2. The first join message is part of a plurality of join messages sent (e.g., at 212 and 214 in FIG. 2) by the clock source network device to a plurality of intermediate network devices including the first intermediate network device 400 between the clock source and the clock sink. The plurality of join messages are responsive to a register message (e.g., PIM Register) from the clock sink for indicating transmission of a second timing message (e.g., a delay-request message) to be sent by the clock sink.

In some examples, responsive to the first join message, the machine-readable instructions in the storage medium 404 build forwarding information (e.g., the S-N forwarding information 154 in FIG. 1) in the first intermediate network device for multicast traffic from the clock sink.

The machine-readable instructions in the storage medium 404 include first join message forwarding instructions 412 to forward, from the first intermediate network device, the first join message to the clock sink network device. For example, in FIG. 2, the primary network device 102-1 forwards at 220 the join message to the access device 110. In some examples, the first join message being forwarded from the first intermediate network device to the clock sink network device causes the clock sink network device to build forwarding information (e.g., S-N forwarding information 156) for multicast traffic from the clock sink.

The machine-readable instructions in the storage medium 404 include second timing message reception instructions 414 to receive, at the first intermediate network device over the second network link from the clock sink network device, the second timing message multicast by the clock sink. For example, in FIG. 2, the primary network device 102-1 receives at 226 the delay-request message sent by the OTC 115 in the client device 114. In some examples, the second network link is selected at the clock sink network device for sending the second timing message to the first intermediate network device based on the forwarding information (e.g., S-N forwarding information 156) built at the clock sink network device.

The machine-readable instructions in the storage medium 404 include second timing message forwarding instructions 416 to forward the second timing message over the first network link from the first intermediate network device to the clock source network device. For example, in FIG. 2, the primary network device 102-1 forwards at 228 the delay-request message to the core device 106. The first network link is selected at the first intermediate network device for forwarding the second timing message based on the forwarding information (e.g., the S-N forwarding information 154 in FIG. 1).

Figure 5:
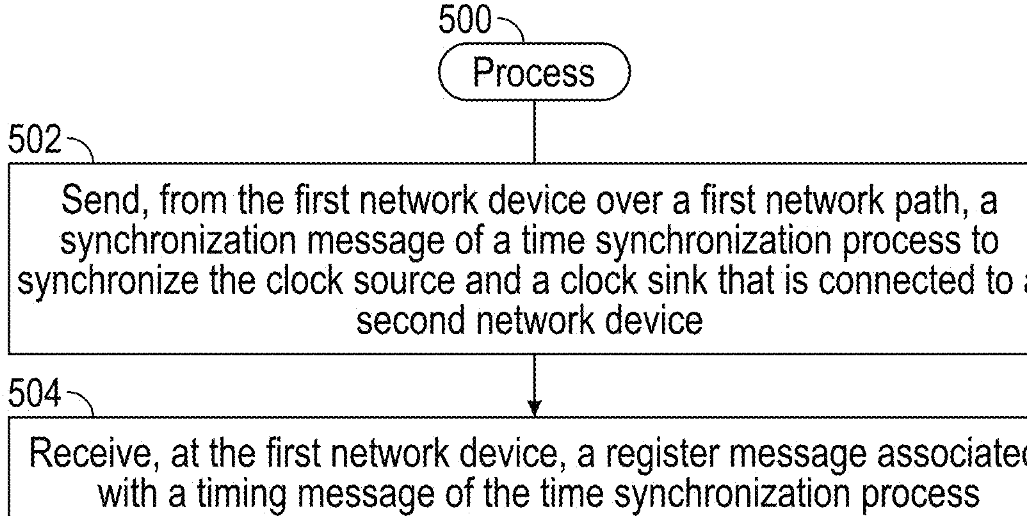
FIG. 5 is a flow diagram of a process according to some examples.

FIG. 5 is a flow diagram of a process 500, which is performed by a first network device including a clock source. An example of the first network device is the core device 106, and an example of the clock source is the BTC 116 in FIG. 1.

The process 500 includes sending (at 502), from the first network device over a first network path, a synchronization message of a time synchronization process to synchronize the clock source and a clock sink that is connected to a second network device. For example, in FIG. 2, the core device 106 sends at 202 the synchronization message. An example of the clock sink is the OTC 115, and an example of the second network device is the access device 110 in FIG. 1.

The process 500 includes receiving (at 504), at the first network device, a register message associated with a timing message of the time synchronization process. The timing message (e.g., a delay-request message) is responsive to the synchronization message and is to be sent from the clock sink. For example, in FIG. 2, the core device 106 receives at 210 the register message sent by the client device 114.

The process 500 includes sending (at 506), from the first network device based on receiving the register message, a first join message to a first intermediate network device that is part of the first network path, and a second join message to a second intermediate network device that is part of a second network path different from the first network path. The first join message is to cause building of forwarding information in the first intermediate network device and the second network device. For example, in FIG. 2, the core device sends at 212 and 214 join messages.

The process 500 includes receiving (at 508), at the first network device over the first network path, the timing message sent by the clock sink, the timing message communicated over the first network path based on the forwarding information built in the first intermediate network device and the second network device. For example, in FIG. 2, the core device receives at 228 the delay-request message.

In some examples, the synchronization message is multicast by the clock source, and the timing message is multicast by the clock sink. The forwarding information built at the first intermediate network device and the second network device includes multicast forwarding information for multicast traffic from the clock sink.

A storage medium (e.g., 300 in FIG. 3 or 404 in FIG. 4) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

As used here, sending or forwarding a packet (e.g., a message) from a first device to a second device can refer to the packet being sent or forwarded directly from the first device to the second device, or indirectly from the first device to the second device through one or more intermediate devices.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a first network device comprising a first time clock to:

send, from the first network device over a first network path, a first timing message of a time synchronization process to synchronize the first time clock and a second time clock that is connected to a second network device;

receive, at the first network device, an indication associated with a second timing message of the time synchronization process, the second timing message to be sent from the second time clock;

based on receiving the indication, send, from the first network device, a first join message to a first intermediate network device that is part of the first network path, and a second join message to a second intermediate network device that is part of a second network path different from the first network path, the first intermediate network device comprising a first transparent clock, and the second intermediate network device comprising a second transparent clock, wherein the first join message is to cause building of forwarding information in the first intermediate network device and the second network device; and receive, at the first network device over the first network path, the second timing message sent by the second time clock, the second timing message communicated over the first network path based on the forwarding information built in the first intermediate network device and the second network device.

2. The non-transitory machine-readable storage medium of claim 1, wherein the instructions upon execution cause the first network device to:

as a response to the second timing message, send a third timing message generated by the first time clock, wherein the third timing message is sent to the second time clock over the first network path.

3. The non-transitory machine-readable storage medium of claim 2, wherein the forwarding information built in the first intermediate network device and the second network device comprises first forwarding information, wherein the first timing message sent from the first network device causes second forwarding information to be built at the first network device and the first intermediate network device, and wherein the third timing message is sent to the second time clock over the first network path based on the second forwarding information.

4. The non-transitory machine-readable storage medium of claim 3, wherein the first forwarding information is for multicast traffic in a first direction from the second time clock, and the second forwarding information is for multicast traffic in a second direction from the first time clock.

5. The non-transitory machine-readable storage medium of claim 4, wherein the first forwarding information is separate from the second forwarding information.

6. The non-transitory machine-readable storage medium of claim 4, wherein the first forwarding information is integrated with the second forwarding information in bidirectional forwarding information for use in multicasting of traffic in each of the first direction and the second direction.

7. The non-transitory machine-readable storage medium of claim 2, wherein the first timing message is a synchronization message, and the second timing message is a delay-request message, the synchronization message and the delay-request message used to compute a time offset between the second time clock and the first time clock.

8. The non-transitory machine-readable storage medium of claim 7, wherein the third timing message is a delay-response message that is responsive to the delay-request message, and the delay-request message further used to compute the time offset between the second time clock and the first time clock.

9. The non-transitory machine-readable storage medium of claim 8, wherein the synchronization message, the delay-request message, and the delay-response message are according to a Precision Time Protocol (PTP).

10. The non-transitory machine-readable storage medium of claim 1, wherein the first and second network paths comprise equal-cost multipath routing (ECMP) paths.

11. The non-transitory machine-readable storage medium of claim 1, wherein the indication comprises a register message from the second network device, the register message comprising information of a multicast group for the time synchronization process.

12. The non-transitory machine-readable storage medium of claim 11, wherein the register message is a Protocol Independent Multicast (PIM) register message.

13. The non-transitory machine-readable storage medium of claim 12, wherein the first and second join messages are PIM join messages.

14. The non-transitory machine-readable storage medium of claim 11, wherein the first and second join messages are to build forwarding information for the multicast group.

15. The non-transitory machine-readable storage medium of claim 1, wherein the first timing message of the time synchronization process passes through the first intermediate network device, the first timing message to cause the first intermediate network device to build forwarding information in a direction from the first network device to the second network device, wherein the forwarding information in the direction from the first network device to the second network device built at the first intermediate network device is to cause the first intermediate network device to process the first join message.

16. The non-transitory machine-readable storage medium of claim 15, wherein the second intermediate network device is to disregard the second join message responsive to the second intermediate network device lacking forwarding information in the direction from the first network device to the second network device.

17. A first intermediate network device comprising:

a hardware processor; and a non-transitory storage medium storing instructions executable on the hardware processor to:

receive, over a first network link, a first timing message multicast by a clock source to initiate a time synchronization process to synchronize a clock sink to the clock source, wherein the clock sink is connected to a clock sink network device;

forward, from the first intermediate network device, the first timing message over a second network link to the clock sink network device, wherein a first network path comprises the first network link and the second network link;

receive, at the first intermediate network device that is part of the first network path, a first join message from a clock source network device that comprises the clock source, wherein the first join message is part of a plurality of join messages sent by the clock source network device to a plurality of intermediate network devices comprising the first intermediate network device between the clock source and the clock sink, wherein the plurality of join messages are responsive to a register message from the clock sink for indicating transmission of a second timing message to be sent by the clock sink;

forward, from the first intermediate network device, the first join message to the clock sink network device;

receive, at the first intermediate network device over the second network link from the clock sink network device, the second timing message multicast by the clock sink; and forward the second timing message over the first network link from the first intermediate network device to the clock source network device.

18. The first intermediate network device of claim 17, wherein the instructions are executable on the hardware processor to:

build, responsive to the first join message, forwarding information in the first intermediate network device for multicast traffic from the clock sink; and select, at the first intermediate network device, the first network link based on the forwarding information built at the first intermediate network device, wherein the first join message forwarded from the first intermediate network device to the clock sink network device is to cause the clock sink network device to build forwarding information for multicast traffic from the clock sink, wherein the second network link is selected at the clock sink network device for sending the second timing message to the first intermediate network device based on the forwarding information built at the clock sink network device.

19. A method of a first network device comprising a clock source, comprising:

sending, from the first network device over a first network path, a synchronization message of a time synchronization process to synchronize the clock source and a clock sink that is connected to a second network device;

receiving, at the first network device, a register message associated with a timing message of the time synchronization process, the timing message responsive to the synchronization message and to be sent from the clock sink;

based on receiving the register message, sending, from the first network device, a first join message to a first intermediate network device that is part of the first network path, and a second join message to a second intermediate network device that is part of a second network path different from the first network path, wherein the first join message is to cause building of forwarding information in the first intermediate network device and the second network device; and receiving, at the first network device over the first network path, the timing message sent by the clock sink, the timing message communicated over the first network path based on the forwarding information built in the first intermediate network device and the second network device.

20. The method of claim 19, wherein the synchronization message is multicast by the clock source, and the timing message is multicast by the clock sink, and wherein the forwarding information built at the first intermediate network device and the second network device comprises multicast forwarding information for multicast traffic from the clock sink.

* * * * *